Sept. 14, 1948. O. W. SCHARPING 2,449,179
MILLING MACHINE
Filed Sept. 24, 1943 3 Sheets-Sheet 1

INVENTOR.
OTTO W. SCHARPING.
BY
Kwis Hudson Boughton & Williams
ATTORNEYS

Sept. 14, 1948.　　　　O. W. SCHARPING　　　　2,449,179
MILLING MACHINE

Filed Sept. 24, 1943　　　　　　　　　　　　　3 Sheets-Sheet 2

INVENTOR.
OTTO W. SCHARPING
BY
Kwis Hudson Boughton & Williams
ATTORNEYS

Sept. 14, 1948.　　　O. W. SCHARPING　　　2,449,179
MILLING MACHINE

Filed Sept. 24, 1943　　　3 Sheets-Sheet 3

INVENTOR.
Otto W. Scharping
BY
Kwis Hudson Boughton & Williams
ATTORNEYS

Patented Sept. 14, 1948

2,449,179

UNITED STATES PATENT OFFICE 2,449,179

MILLING MACHINE

Otto W. Scharping, Cleveland, Ohio, assignor to The Martindale Electric Company, Cleveland, Ohio, a corporation of Ohio Application September 24, 1943, Serial No. 503,675

12 Claims. (Cl. 90—13.9)

This invention relates to improvements in milling machines, more particularly machines for milling teeth in steel burs (also known as rotary files), such as are employed in power tools for cleaning castings, finishing dies, and performing other operations of a similar character.

Burs wherein all of the teeth are spiral, are cut at the same angle and meet at one point on the end of the bur are well known in the art. Machines for forming burs of that design are also known in the art. Spiral teeth are highly desirable because in action they cut with what may be described as a draw cut, whereas straight teeth even though angular in arrangement have a less effective cutting action. In a spiral toothed bur wherein all of the teeth have the same angle, the teeth meet at one point at the end of the cutter. As they approach that point the teeth necessarily come close together and their height correspondingly decreases. Naturally therefore, wear renders the end of the bur useless, while the side portions thereof are still in good condition.

The machine of the present invention is so designed as to be capable of cutting a plurality of fields of spiral teeth, the angularity of the spirals in each field varying from one side of the field to the other. One tooth only of each field terminates at the end of the bur at the point previously referred to. The other teeth of each field terminate at points spaced progressively away from the central end point of the bur, and the depths of the teeth remain approximately uniform throughout their length. Consequently wear is more nearly uniform throughout the extent of the bur surface.

Accordingly one of the objects of the invention is the provision of a machine adapted to form in a bur a plurality of fields of spiral teeth with varying angularity and approximately constant depth.

Other objects and features of novelty will appear as I proceed with the description of that embodiment of the invention which, for the purposes of the present application, I have illustrated in the accompanying drawings, in which Fig. 1 is a perspective view of a milling machine embodying the invention;

Figure 1:
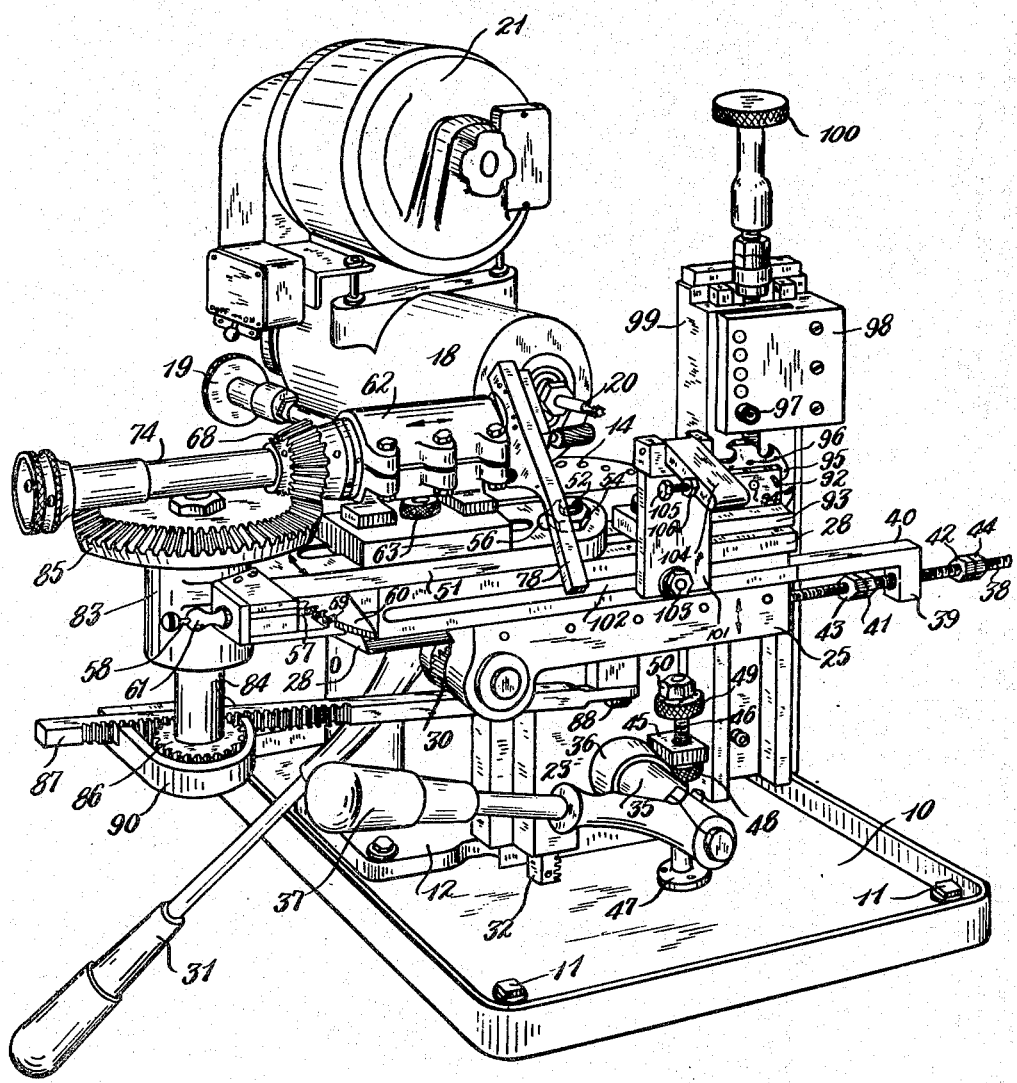
Figure 2:
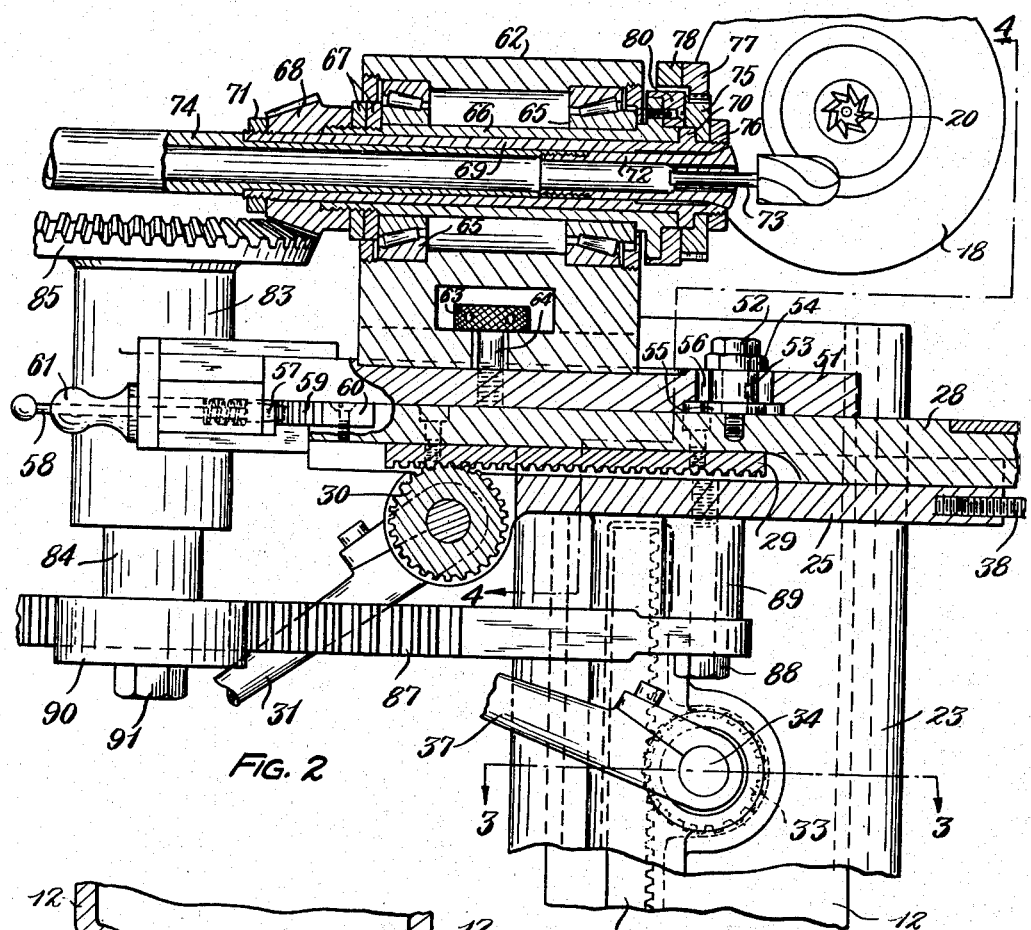
Fig. 2 is an elevational view, partly in section on a vertical plane extending from front to rear of the machine.

In the drawings there is illustrated a base 10 which is arranged to be attached to a bench or other rigid support by means of bolts or screws 11. The body 12 of the machine is mounted upon and suitably secured to the base 10. The body member 12 is provided with ways 13 upon which an arcuate plate 14 is slidably mounted, and to which it is adapted to be locked in any position of adjustment by suitable means, not shown. A vertical pin 15 mounted in the plate 14 serves as a pivot for one end of a block 16 which rests upon plate 14 and is adapted to be swung about its pivot to various angular positions in any of which it may be secured by a pin, not shown, fitted into one of a series of holes 17 in the plate.

The block 16 is provided with ways in which a casting 18 is mounted to slide. A screw feed operated by a hand wheel 19 serves to move casting 18 in its ways and to hold it in adjusted position. Casting 18 carries journals for a tool spindle having a collet in which a milling cutter 20 may be mounted. The position and angularity of the cutter may be regulated by the adjustments of the block 16 and casting 18 as just described. The casting 18 may be conveniently provided with means for mounting an electric motor 21 arranged to drive the tool spindle through a belt, not shown.

When the tool spindle has been adjusted to the proper position for any particular piece of work, it remains fixed in that position. The work spindle, now to be described, is moved up into contact with the cutter, and while in its raised position is reciprocated and simultaneously rotated through a predetermined angle to cause a spiral cut to be made from one end of the work to the other. The work spindle is also adjusted between cuts to assume different angles relatively to the cutter. My invention resides primarily in the provision of means for accomplishing these movements and adjustments.

On the side of the body member 12 exposed to view in Fig. 1 there are formed a pair of upright ways 22 upon which there is mounted a vertical slide 23, an adjustable gib 24 being provided for taking up wear. A horizontal shelf 25 projects outwardly from near the upper end of vertical slide 23, and in this shelf a pair of horizontal ways 26 are formed, an adjustable gib 27 being employed in this case also. A bed 28 is mounted to reciprocate in the ways 26, its movement being effected by a rack 29 fastened within a goove within the bottom of the bed and meshing with a pinion 30 journaled in an enlargement at one end of shelf 25 and arranged to be oscillated by a handle 31.

The rising and falling of vertical slide 23 and shelf 25 carried thereby is effected by means of a rack 32 fixed in a shallow groove in the body member 12 and a pinion 33 meshing therewith and carried upon the inner end of a shaft 34 which turns in a bushing 35 supported in a cylindrical projection 36 integral with the slide 23. A handle 37 clamped to the outer end of shaft 34 serves to oscillate the shaft and the pinion 33, causing the slide 23 and shelf 25 to move up or down. In order to limit the movement of bed 28 in opposite directions I may mount a threaded rod 38 in one end of shelf 25, this rod extending with clearance through a hole in a depending angular part 39 of an extension 40 on the bed. Nuts 41 and 42 and lock nuts 43 and 44 threaded upon the rod 38 provide adjustable stops. To provide stops for the vertical movement of the slide 23, the latter may have attached thereto a projecting plate 45 with a hole therethrough large enough to clear a threaded rod 46 which has a flange 47 at its lower end that is secured to the base 10 of the machine. Nuts 48 and 49 threaded upon the rod 46 below and above the plate 45 and held in adjusted position by lock nuts, one of which is shown at 50, limit the downward and upward movement respectively of the slide.

A table 51 rests upon the top of bed 28. It is arranged to turn about a pivot pin 52 that is threaded into bed 28 and is surrounded by a bushing 53 which has a hex head 54, and a threaded lower end to receive a nut 55, the head 54 and the nut 55 overlapping the sides of a slot 56 in the table 51 by means of which the position of the bushing in the slot 56 may be adjusted. Table 51 is adapted to be moved through a limited angle about pivot pin 52 and to be held in different angular positions by a detent 57 at one end of a spring pressed pull rod 58 carried at the end of table 51 and taking into any one of a series of notches 59 cut in an arcuate plate 60 which is secured to bed 28. A handle 61 through which the rod 58 is slidable provides a convenient means for swinging the table 51 about its pivot.

An index head 62 is so mounted in table 51 as to have a limited adjustment lengthwise of the table, being secured in position by a nut 63 which is threaded upon the upper end of a stud 64 mounted in the table. Head 62 carries a pair of roller bearings 65, the inner races of which are mounted upon a sleeve 66 and held between a shoulder on that sleeve and threaded adjusting collars 67. One end of sleeve 66 projects beyond the collars 67 and receives the threaded hub of a bevel pinion 68. Sleeve 66 is rotatably mounted upon an inner sleeve 69, the two sleeves being held against relative longitudinal movement by a shoulder 70 at one end of sleeve 69 and a nut 71 threaded onto the opposite end thereof and engaging bevel pinion 68.

The inner end of sleeve 69 is tapered internally to receive the tapered fingers of a collet 72 in which the shank 73 of a piece of work is adapted to be secured. The collet may be drawn into the sleeve 69 to grip the work by means of a hollow draw bar 74 that is threadably connected with the rear end of collet 72.

Figure 4:
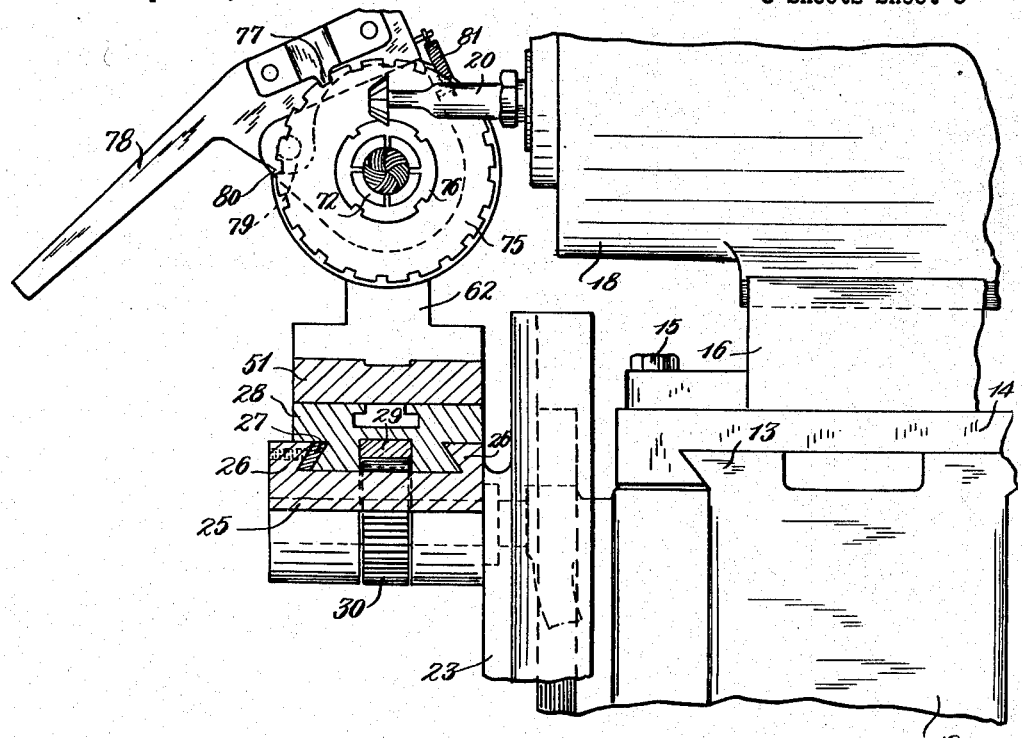
Fig. 4 is a fragmental elevational view taken partly in section along the line 4—4 of Fig. 2.
Figure 5:
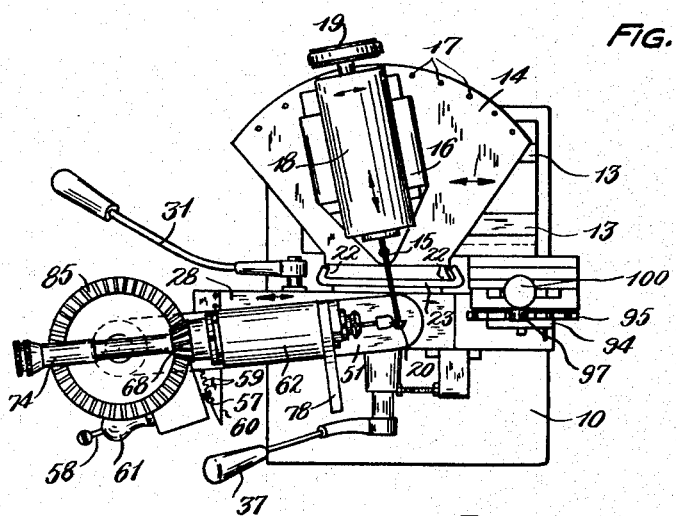
Fig. 5 is a plan view, diagrammatic in character, illustrating the principal parts of the machine.

Means are provided for releasably locking the two sleeves 66 and 69 together, this means consisting of a latching mechanism comprising a disk 75 with indentations in its periphery surrounding the inner end of sleeve 69 and locked against shoulder 70 thereof by means of a nut 76. Cooperating with the latching disk 75 there is a pawl 77 carried by a lever 78 that is pivoted at 79 (see Fig. 4) on a bracket 80 secured to sleeve 66. Pawl 77 is biased toward operative position by a tension spring 81 connected at one end with lever 78 and at the other with a pin on bracket 80. When the operator presses down on the lever 78 with one hand the pawl is withdrawn from the indentation theretofore engaged and the inner sleeve may be turned in the outer sleeve by the other hand of the operator grasping the knurled head of draw bar 74. Thus the work may be indexed the desired amount and the pawl permitted to engage a new indentation. The inner sleeve, the draw bar and the collet collectively constitute a work spindle which turns with the outer sleeve as the bed reciprocates, and which may be rotated independently of the outer sleeve for indexing purposes.

Cast integral with the table 51 at the free end of the latter there is a vertical housing 83 within which are mounted bearings for a vertical shaft 84 which carries at its upper end a horizontal bevel gear 85 meshing with bevel pinion 68. At its lower end this shaft carries a spur gear 86, both of the gears 85 and 86 being fixed upon the shaft by keys or the like. A rack 87 is pivotally mounted on the shank of a bolt 88 which is threaded into a projection 89 depending from the shelf 25. Rack 87 is held in meshing relation with the spur gear 86 by a yoke 90 having notches through which the rack may slide. Shaft 84 extends through a smooth hole in the bottom of the yoke in order to permit the latter to oscillate upon the shaft, and the yoke is supported by a nut 91 threaded onto the lower extremity of the shaft. As the table moves back and forth with reciprocating bed 28, spur gear 86 is caused to ride along the rack 87 which of course imparts oscillation to the gear 85 and through that gear and pinion 68 to the two sleeves 69 and 66 carrying the work piece, and this is true whatever may be the angular relation between the bed 28 and the table 51.

On the inner end of reciprocating bed 28 I mount a bracket 93, the upright portion of which carries a pivot pin 94. A cam plate 95 is arranged to turn upon pin 94. This plate is provided with a series of cams spaced around its periphery equal in number to the number of teeth to be cut in each field of the particular piece of work to be handled. The cam plate 28 has holes 96 drilled therethrough (one only being illustrated) equal in number to the number of cams on the plate, and a locking pin 92 projects through a suitable hole in the bracket into any one of the holes 96 to hold the cam plate in its various positions of adjustment. Any other suitable means for the purpose may of course be used. The cams on the cam plate cooperate with a roller follower 97 carried by a plate 98 which is adjustable up and down upon a standard 99 attached to the body member 12, preferably by means of a screw, not shown in detail, arranged to be turned by a hand wheel 100.

A vertical plate 101 is adjustably mounted on the reciprocating bed 28 by means of a T-slot 102 and a cooperating bolt 103. At its upper end it has a pair of bifurcations between which is pivotally mounted one end of an arm 104. A stud 105 threadably mounted in arm 104 and held in adjustable position by a jam nut 106 constitutes a stop. When the arm 104 is swung upwardly and over to a position of about 180 degrees from its illustrated position, the head of stud 105 comes into alignment with the axis of the work spindle and serves as a stop to determine the proper longitudinal position of the work in its collet. When the machine is in operation the arm 104 is of course swung outwardly to its position illustrated in Fig. 1.

Figure 7:
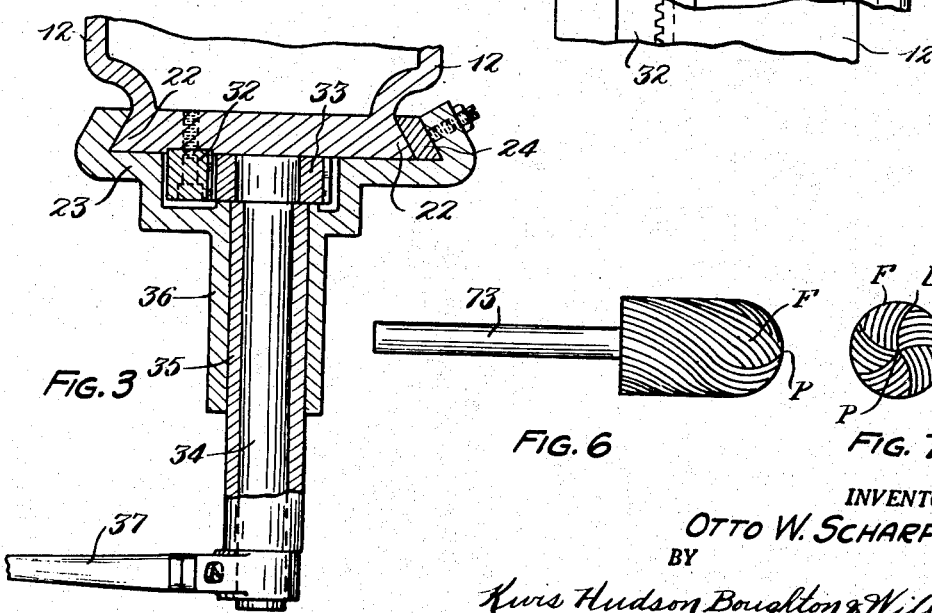
Figs. 6 and 7 are side and end views respectively of a bur which may be fashioned on the machine of this invention.
Figures 3, 6:
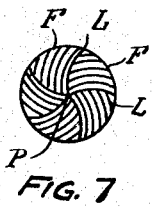
Fig. 3 is a horizontal sectional view of the bed raising and lowering means, the view being taken substantially on the line 3—3 of Fig. 2.

The machine is adapted to operate upon work pieces of various longitudinal contours, for example cylinders, cones and spheres. The work piece herein illustrated, particularly in Figs. 6 and 7, is a cylinder with a hemispherical end. It is shown as having five fields F, each of which has one long tooth L and a number of other teeth of different lengths. The teeth L meet at the central end point P of the bur. Each of the shorter teeth of a field terminates at the long tooth of an adjacent field, and in order that this may be so, the spiral angularity of each short tooth is different from that of the long tooth and all of the other short teeth of the field. However, the spiral angularity of each tooth in a field is the same as the spiral angularity of a corresponding tooth in each of the four other fields.

Each of the cams of the cam plate 95 has a straight portion corresponding to the cylindrical part of the work piece and a low spot corresponding to the descent from the cylindrical periphery of the work to the end of a particular tooth.

*Operation.*—When a completed piece of work is to be removed and a new piece inserted, the operator turns draw bar 74 to the left to relieve the pull on the collet 72. At this time, the bed being stationary, bevel gear 85 is fixed and functions through bevel pinion 68 to hold sleeve 69 against any tendency to rotate due to the rotation of draw bar 74. The finished work is then removed and a new piece inserted into the collet. The stop arm 104 is now swung inward and the end of the work piece caused to contact the head of stud 105 and held in that position by one hand of the operator while with his other hand he rotates draw bar 74 to the right to tighten the collet. The operator next indexes cam plate 95 to the proper position for the long cuts. He then retracts rod 58 and swings table 51 into parallelism with bed 28. The machine is now set to cut the long teeth L, and the operator grasps handle 31 and pulls it up to slide bed 28 and table 51 forwardly, the work being spaced below the cutter. Next with his right hand he depresses handle 37 which lifts shelf 25 with bed 28 and table 51 to cause the rear end of the work to contact the rotating cutter 20. This rising motion is limited by the engagement of roller follower 97 with the cam on cam plate 95. Now while holding the cam against the follower with his right hand, the operator depresses handle 31 to retract the bed 28 and table 51, causing the work to move toward the operator. As it does so the work spindle is oscillated through the action of rack 87, spur gear 86, shaft 84, bevel gear 85, bevel pinion 68 and sleeves 66 and 69. This combined longitudinal and rotational movement results in the desired spiral cut. As the rounded end of the work approaches the cutter, the contour of the cam permits the right hand of the operator to raise the work gradually higher until the cut reaches the central forward point P of the work. The operator then relieves his right hand pressure on handle 37 to permit the bed and table to descend, and pulls up on handle 31 to again advance the work, now out of contact with the cutter, to the initial position. He now presses down upon the outer end of lever 78 to unlatch the two sleeves 66 and 69 and turns draw bar 74 through one-fifth of a revolution, thereby rotating sleeve 69 within sleeve 66 to index the work for the second long cut. After repeating the operations heretofore described for making the second long cut, he indexes again for the third cut and so on until all of the five long cuts have been made. Then he turns cam plate 95 to bring another cam into operative position and swings table 51 to change its angular position, thereby preparing the machine for the five next shorter cuts, after which those cuts are made by the same procedure as for the long cuts. The further operation to complete all of the cuts for all of the five fields will be obvious from the foregoing description.

When all of the roughing cuts have been made, it is usually advisable to finish the work by going over each of the teeth in an opposite direction, that is beginning the cut at the point of the work and terminating it at the flat end. The procedure is the same except that the handles 31 and 37 are so operated that the work is drawn toward the operator while out of contact with the cutter and moved away from the operator while in contact with the cutter.

Having thus described my invention, I claim:

1. In a milling machine of the character described, a rotating cutter held against bodily movement, a reciprocating bed, a work table mounted to swing on said bed, said table carrying a rotatable work spindle for supporting the work in engagement with said cutter, means for indexing said spindle, indexing means for varying the angle between said bed and table, and means dependent upon the reciprocation of said bed for rotating said spindle through a predetermined angle during each stroke of the bed, hand lever means for reciprocating said bed and simultaneously operable hand lever means for raising or lowering said bed.

2. In a milling machine of the character described, a rotating cutter held against bodily movement, a bed, means for causing reciprocation of said bed, a work table mounted to swing on said bed, said table carrying a rotatable spindle for supporting the work, means effective to cause relative movement of said bed and cutter toward and away from each other, cam and cam follower means for controlling said relative movement during said relative reciprocation, means for indexing said spindle, indexing means for varying the angle between said bed and table and means dependent upon said relative reciprocation for rotating said spindle through a predetermined angle during such reciprocation.

3. In a milling machine of the character described, a rotating cutter, a reciprocating bed spaced vertically from said cutter, a work table mounted to swing on said bed, said table carrying a rotatable work spindle, means effective to cause relative vertical movement between said bed and cutter, cam and cam follower means for controlling said relative vertical movement during longitudinal travel of the bed, means for indexing said spindle, indexing means for varying the angle between said bed and table, and means dependent upon the reciprocation of said bed for rotating said spindle through a predetermined angle during each stroke of the bed.

4. In a milling machine of the character described, a rotating cutter, a reciprocating bed, hand lever means for reciprocating said bed, a work table mounted to swing on said bed, said table carrying a rotatable work spindle for supporting the work beneath said cutter, hand lever means effective to raise said reciprocating bed for holding the work in contact with said cutter, means for indexing said spindle, indexing means for varying the angle between said bed and table, and means dependent upon the reciprocation of said bed for rotating said spindle through a predetermined angle during each stroke of the bed, said two hand lever means being conveniently disposed for simultaneous actuation by the two hands of an operator.

5. In a milling machine of the character described, a rotating cutter, a reciprocating bed, a work table mounted to swing on said bed, said table carrying a rotatable work spindle for supporting the work beneath said cutter, means effective to raise said reciprocating bed, cam and cam follower means for controlling said bed raising means during longitudinal travel of the bed, means for indexing said spindle, indexing means for varying the angle between said bed and table, and means dependent upon the reciprocation of said bed for rotating said spindle through a predetermined angle during each stroke of the bed.

6. In a milling machine of the character described, a rotating cutter, a reciprocating bed, a work table mounted to swing on said bed, said table carrying a rotatable work spindle for supporting the work beneath said cutter, means for indexing said spindle, indexing means for varying the angle between said bed and table, means effective to raise said reciprocating bed, cam and cam follower means interposed between said bed and a stationary part of the machine for controlling said bed raising means during longitudinal travel of the bed, said cam means comprising a disk carrying a series of cams and a rotatable mounting for said disk, whereby any one of said series of cams may be brought into operative relation with said cam follower means.

7. In a milling machine of the character described, a rotating cutter, a reciprocating bed, a work table mounted to swing on said bed, said table carrying a rotatable work spindle for supporting the work beneath said cutter, means for indexing said spindle, indexing means for varying the angle between said bed and table, means effective to raise said reciprocating bed, cam and cam follower means interposed between said bed and a stationary part of the machine for controlling said bed raising means during longitudinal travel of the bed, said cam means comprising a disk carrying a series of cams and a rotatable mounting for said disk, whereby any one of said series of cams may be brought into operative relation with said cam follower means, and means dependent upon the reciprocation of said bed and table for rotating said spindle through a predetermined angle during each stroke of the bed.

8. In a milling machine of the character described, a rotating cutter, a reciprocating bed, a work table mounted to swing on said bed, said table carrying a rotatable work spindle for supporting the work beneath said cutter, means for indexing said spindle, indexing means for varying the angle between said bed and table, a pinion journaled on said table and operatively connected with said spindle for rotating the latter, and a rack mounted to swing about a fixed axis and maintained in operative relation with said pinion in all angular positions of said table.

9. In a milling machine of the character described, a work table, reciprocating means therefor, a sleeve rotatably mounted in said table at an angle to the direction of reciprocation, a work spindle rotatably and non-slidably mounted in said sleeve, indexing means for locking said spindle and sleeve together in selected angular relations, and means dependent upon reciprocation of said table for rotating said sleeve.

10. In a milling machine of the character described, a work table, reciprocating means therefor, a sleeve rotatably mounted in said table at an angle to the direction of reciprocation, a work spindle rotatably and non-slidably mounted in said sleeve, indexing means comprising a disk member with indentations in its periphery and a pawl member cooperating therewith, one of said members being connected with said sleeve and the other with said spindle, whereby the spindle and sleeve may be locked together in selected angular relations, and means dependent upon reciprocation of said table for rotating said sleeve.

11. In a milling machine of the character described, a work table, means for reciprocating said table, means for causing said table to assume different angular positions with respect to its direction of reciprocation, a sleeve rotatably mounted in said table, a work spindle rotatably and non-slidably mounted in said sleeve, indexing means for locking said spindle and sleeve together in selected angular relations, and means dependent upon reciprocation of said table for rotating said sleeve.

12. In a milling machine of the character described, a rotating cutter, a reciprocating bed, a work table mounted to swing on said bed, said table carrying a rotatable work spindle, means effective to move the bed in a direction normal to the plane thereof toward and away from said cutter, cam and cam follower means for controlling said last mentioned bed moving means during the longitudinal travel of the bed, means for indexing said spindle, indexing means for varying the angle between said bed and table, and means dependent upon the reciprocation of said bed for rotating said spindle through a predetermined angle during each stroke of the bed.

OTTO W. SCHARPING.

REFERENCES CITED

The following references are of record in the file of this patent:

UNITED STATES PATENTS

| Number | Name | Date |
|---|---|---|
| 179,153 | Bonaventure et al. | June 27, 1876 |
| 364,832 | Maillard | June 14, 1887 |
| 607,626 | Reece | July 19, 1898 |
| 1,376,155 | Muller | Apr. 26, 1921 |
| 1,870,764 | Aeppli | Aug. 9, 1932 |
| 1,976,818 | Ward | Oct. 16, 1934 |
| 2,083,858 | Nichols | June 15, 1937 |
| 2,212,855 | Chittenden | Aug. 27, 1940 |
| 2,332,510 | Franzen | Oct. 26, 1943 |
| 2,335,468 | Zwick | Nov. 30, 1943 |

FOREIGN PATENTS

| Number | Country | Date |
|---|---|---|
| 90,998 | Switzerland | Oct. 1, 1921 |
| 327,220 | Germany | Oct. 8, 1920 |